United States Patent [19]

Freeder et al.

[11] 3,730,320
[45] May 1, 1973

[54] HIGH TEMPERATURE BRAKE DISC

[75] Inventors: Herman Freeder; Homer E. Wilt, both of Akron, Ohio

[73] Assignee: The B. F. Goodrich Company, New York, N.Y.

[22] Filed: May 12, 1971

[21] Appl. No.: 142,621

[52] U.S. Cl......192/107 M, 188/218 XL, 188/251 A
[51] Int. Cl................................................F16d 11/00
[58] Field of Search......................192/107 M, 107 R; 188/73.2, 218 XL, 251 A

[56] References Cited

UNITED STATES PATENTS

| | | | |
|---|---|---|---|
| 1,227,151 | 5/1917 | Jensen | 192/107 R |
| 2,175,399 | 10/1939 | Judd | 192/107 M |
| 2,640,795 | 6/1953 | Bertolet, Jr. | 192/107 M |
| 3,552,533 | 10/1968 | Nitz et al. | 192/107 M |

FOREIGN PATENTS OR APPLICATIONS 478,974   9/1936   Great Britain.......................192/107

Primary Examiner—Charles J. Myhre
Assistant Examiner—Randall Heald
Attorney—John D. Haney and W. A. Shira, Jr.

[57] ABSTRACT

An annular disc for brakes or clutches in which segmented strips of resin impregnated carbon or graphite cloth are assembled in a partially overlapping relationship with opposite ends of each strip at opposite faces of the disc. The disc is formed and cured under high temperature and pressure to bond the strips together and then pyrolized to produce a carbon or graphite char bond matrix for resisting high temperatures of operation and providing a friction surface composed of the graphite or carbon cloth of the strips and the carbon or graphite binding material between strips.

4 Claims, 5 Drawing Figures

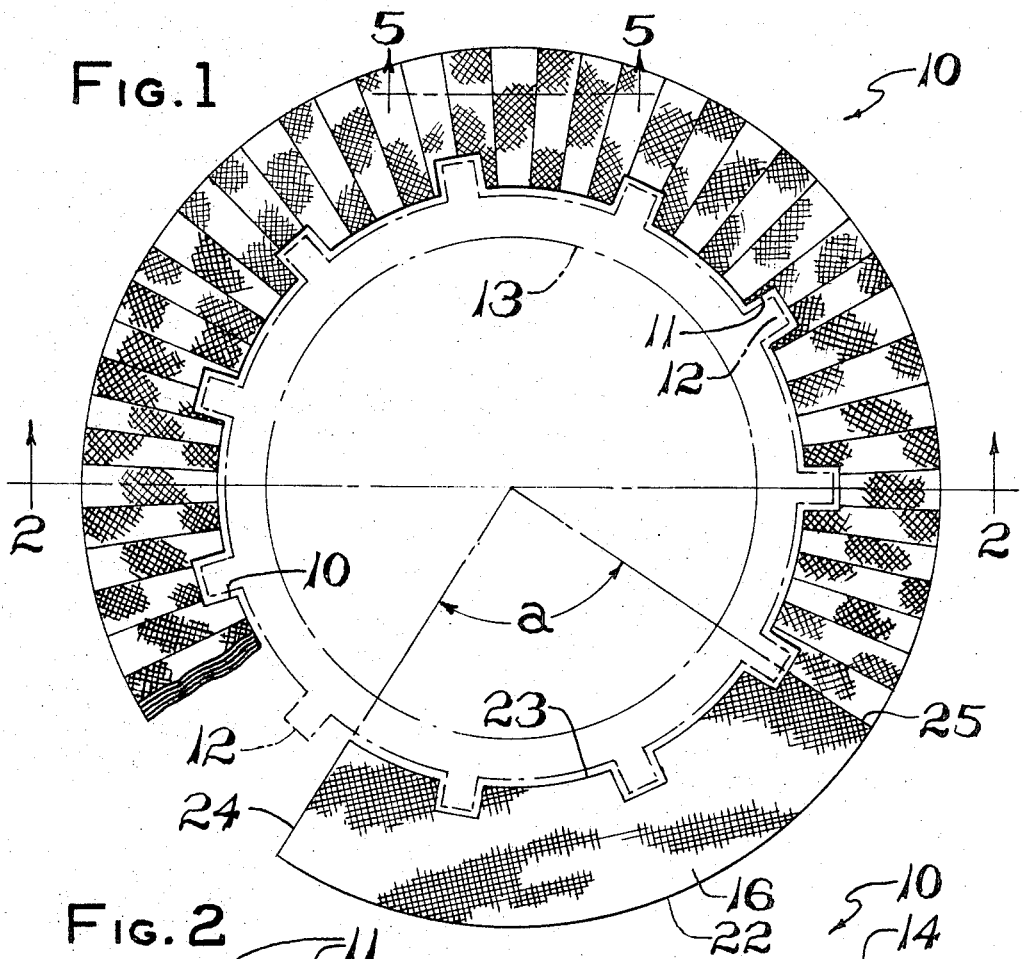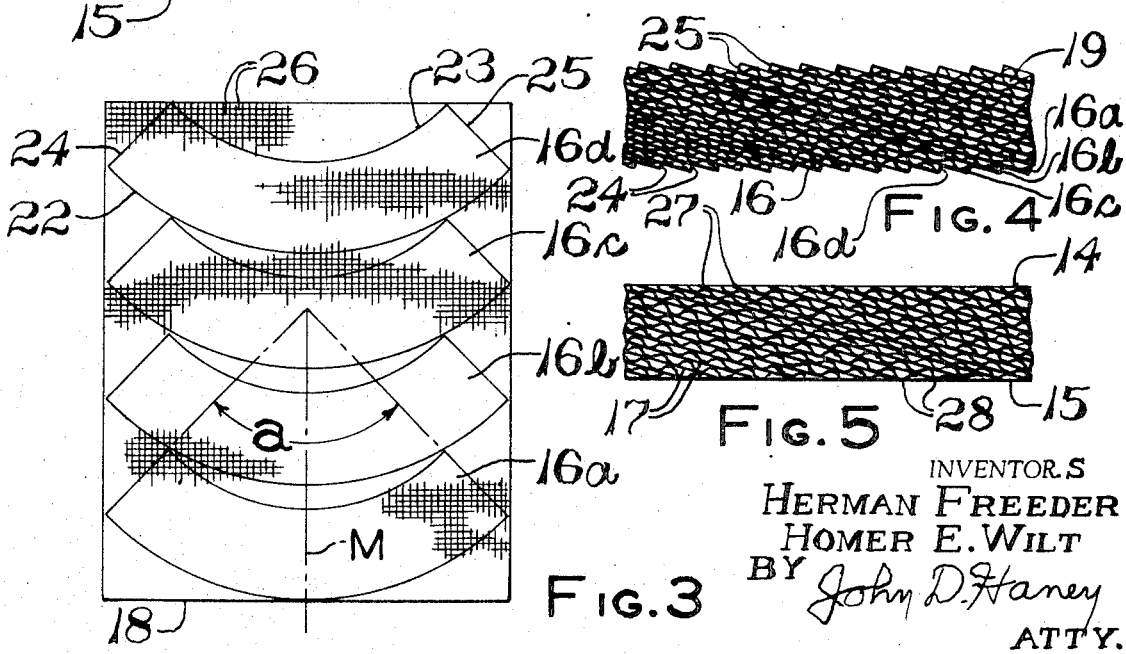

HIGH TEMPERATURE BRAKE DISC

BACKGROUND OF THE INVENTION

This invention relates to disc type brakes or clutches and particularly to the annular friction disc members which engage other friction disc members during operation of the brake or clutch. These friction disc members are referred to as the "heat sink elements" in high energy brakes such as those used, for example, in aircraft where they must absorb great quantities of heat and withstand extremely high temperatures during the braking operation. The friction disc members may have surfaces which engage friction surfaces on other disc members during the braking operation.

It has been found that brake discs made up of pyrolized cloth and resin laminated in a flat plate or ring will withstand very high temperatures and have good strength properties. There are other materials such as beryllium which will absorb more heat than the high temperature carbon or graphite brake discs; however, these materials will not withstand the high temperatures accommodated by the pyrolized carbon graphite construction. The laminated carbon and graphite discs also have a low density and are therefore able to meet the weight and space requirements for aircraft brakes.

With the flat plate laminated carbon or graphite discs, the wear due to frictional engagement with other discs, was concentrated on the top or outermost disc and resulted in uneven wearing of these surfaces. As the top laminated sheet wore through, the bonding material would be exposed and this would further aggravate the uneven nature of the friction surface. It was also found that during the fabrication of the discs, the volatile gases generated during the forming and pyrolization were not always removed which resulted in gas pockets within the disc which created a weakness in the structure and also caused further uneven wearing and operation of the discs when they were worn down to the area in which the gas pockets were formed. Cost was also a factor which worked against the use of these discs since the pyrolized cloth from which the sheets are cut is expensive and there was considerable waste in the center and around the edges of the rings cut from the cloth to make the flat laminated graphite and carbon discs used heretofore.

SUMMARY OF THE INVENTION

According to this invention, the brake disc is built up in such a way that the wear is evenly distributed around the face of the disc with the ends of each strip of pyrolized material in frictional engagement with another braking member. Furthermore, as the disc wears, the ends of the strips wear down exposing new ends which further maintain the even distribution of stress and frictional engagement around the disc. The bonding material which is also pyrolized is exposed along with the ends of the strips making up the brake and provides a mix of materials which can be utilized to obtain the desired frictional properties for an application. The difficulty with gas pockets is also reduced because the gas paths out of the laminated structure are increased and of shorter length.

With the construction of this invention the strips of pyrolized material may be cut in short segments instead of in the shape of a ring and with this shape much more of the pyrolized cloth can be used with very little waste, thus reducing the cost of the discs.

The accompanying drawings show one preferred form made in accordance with and embodying this invention and which is representative of how this invention may be practiced.

BRIEF DESCRIPTION OF THE DRAWINGS

In the drawings:

FIG. 1 is a side elevation of an annular disc with some of the laminated strips being broken away to illustrate the construction and having grooves at the inner diameter for engagement with a splined torque tube, the sides of which are represented by the chain-dotted line.

FIG. 2 is a sectional view of the disc taken along the plane of line 2—2 of FIG. 1.

FIG. 3 is a plan view of a sheet of pyrolized cloth showing how the strips are cut from the sheet.

FIG. 4 is an enlarged sectional view of a portion of the disc during construction showing how the strips are laid up in partially overlapping condition.

FIG. 5 is an enlarged fragmentary sectional view taken along the plane of line 5—5 of FIG. 1.

DETAILED DESCRIPTION

Referring to FIGS. 1 and 2, a high temperature disc assembly 10 is shown in the completed condition having grooves 11 for engagement with splines 12 of a torque tube 13 which may be part of a brake structure, not shown. The disc assembly 10 is shown here as a stator; however, it is understood that it may also be used as a rotor with the grooves at the outer diameter for engagement with a rotating part. The disc assembly 10 is an annular body having flat parallel faces 14 and 15 at opposite sides thereof for frictional engagement with other discs or brake parts, not shown. The disc assembly in its finished condition is a unitary annular body of pyrolized carbon or graphite material which is built up from a plurality of segmental strips 16 bonded together by a char bond 17 which is shown more clearly in FIG. 5.

To better understand the construction, the preferred method of manufacturing the disc assembly 10 is set forth. As shown in FIG. 3, a sheet 18 of pyrolized cloth is shown which is chosen for the final properties desired and this usually is a function of the carbon content of the fabric. Although several different materials may be used, it has been found that rayon is satisfactory for this application. The sheet 18 may be of either graphite cloth or carbon cloth depending upon the degree of pyrolization. The process for making this material is well known in the art and therefore it will not be described here. The fabric of the sheet 18 has been impregnated with a high temperature thermosetting resin 19 or other bonding material such as phenolic shown more clearly in FIG. 4. This resin material 19 is chosen for its ability to convert into carbon or graphite upon pyrolization during a later step in the manufacture of the disc assembly 10.

The strips 16 are in the form of segmental members having curved sides 22 and 23 at the inner and outer diameters respectively. The strip 16 may extend circumferentially in an arc preferably from 45° to 180° and in this particular case, the angle A, shown in FIGS.

1 and 3, is 90° indicating a strip having a circumferential length encompassing an arc of 90°. It is understood that other lengths from 0° to 45° and over 180° may also be used for some applications. In the embodiment shown, the strips 16a, 16b, 16c and 16d may be cut out of the sheet 18 with a minimum of waste material by nesting the strips together with the curved sides 22 at the outer diameter next to the curved sides 23 at the inner diameter.

After the strips 16 are cut from the sheet 18, they are laid up in a partially overlapping condition, as shown in FIG. 4. Each of the strips 16 has ends 24 and 25 which extend into the faces 14 and 15 respectively of the disc assembly and, as shown in FIG. 1, by continuing the overlapping lay-up of the strips an annular configuration is obtained.

As shown in FIG. 3, the sheet 18 of pyrolized cloth may have cords 26 constituting the warp of the cloth which extend in a direction tangential to the curved side 22 of the strips 16 at a midpoint M. This provides for greater strength in the peripheral direction for the disc assembly 10 shown in this embodiment. It is understood that for other strength requirements the cords 26 may be at different angles and the strips 16 may be assembled with the cords 26 crossing at an angle to provide balanced strength characteristics for particular applications where the stresses on the disc assembly are more severe in other directions.

After the strips 16 have been laid up in the annular configuration, shown in FIGS. 1 and 4, the disc 10 is subjected to high pressures and high temperatures in an autoclave or hydraulic press where the thermosetting resin 19 is cured. The disc assembly 10 is then removed and any glaze on the surfaces is removed by a vapor or grit blast to open the microscopic holes in the surface providing for passage of gas from the disc assembly which may then be placed in another heater or oven at a temperature slightly above the cure temperature for further curing of the resin 19 and removal of the residual gases from the disc assembly. With the overlapping laid-up construction of this invention there are shorter passages leading to the faces 14 and 15 as well as to the inner diameter and outer diameter through which the gases may pass. After this postcure operation, the disc assembly 10 is pyrolized at which time the resin 19 is converted to a char bond 17 of graphite at a higher temperature such as 2,800° C. or to carbon at a lower temperature such as 1,400° C. This operation is done in a controlled atmosphere and in a manner well known in the art.

The disc assembly 10 may then be subjected to a filling process during which gas or resin is forced into the disc assembly through the microscopic openings and gas paths to build up deposits within the assembly which may be converted to carbon or graphite. The disc assembly 10 is then slowly cooled under controlled conditions to prevent any temperature shock to the material of the assembly. Following this operation, the disc assembly 10 may be machined giving it a final smooth shape, as shown in FIG. 1, with grooves 11 at the desired positions.

As shown in FIGS. 1 and 5, the resin material 19 which has been pyrolized forms the char bond 17 between the strips 16 and this may be of carbon or graphite as explained heretofore. The faces 14 and 15 are made up of the exposed ends 24 and 25 of the strips 16 and of the exposed faces 27 and 28 of the char bond 17. This provides for an improved and constant friction surface throughout the wear life with balanced physical properties. The type of surface at the faces 14 and 15 can be manufactured for the service requirements of the brake or clutch. For example, the exposed ends 24 and 25 of the strips 16 may be either of carbon or graphite depending upon whether the sheet of pyrolized cloth 18 from which they are cut is a graphite cloth or carbon cloth. Furthermore, the char bond faces 27 and 28 may be either of graphite or carbon depending upon the temperature at which the disc assembly 10 is pyrolized.

In operation of this disc assembly, the faces 14 and 15 are in frictional engagement with other brake parts and the surfaces 24 and 25 of the strips 16 and the surfaces 27 and 28 of the char bond 17 will be worn down; however, as this occurs the surfaces of adjacent portions of the strips 16 and char bond 17 will be exposed providing a uniform frictional surface at all times with a brake construction which is suitable for operation in the 2,000° F. to 3,500° F. operation range. This is done with a construction which is structurally sound and relatively economical to manufacture.

We, therefore, particularly point out and distinctly claim as our invention:

1. A high temperature disc for a brake or clutch comprising an annular body having parallel faces and a plurality of partially overlapping strips of carbon cloth bonded together by pyrolized resin disposed between said overlapping strips, each of said strips extending circumferentially of said disc from one to the other of said faces with one end of each of said strips and said pyrolized resin forming a portion of said one of said faces and the other end of each of said strips and said pyrolized resin forming a portion of said other of said faces whereby the optimum proportion of carbon cloth and pyrolized resin may be provided as said parallel faces wear and the ends of said strips are worn progressively exposing adjacent portions of the overlapped strips and pyrolized resin for frictional engagement with another brake part.

2. A high temperature disc for a brake or clutch comprising an annular body having parallel faces and a plurality of partially overlapping strips of high temperature pyrolized material bonded together by a pyrolized bonding material disposed between said overlapping strips, each of said strips extending circumferentially of said disc from one to the other of said faces with one end of each of said strips of pyrolized material and said pyrolized bonding material forming a portion of said one of said faces and the other end of each of said strips and said bonding material forming a portion of said other of said faces whereby the optimum proportion of high temperature material and bonding material may be provided as said parallel faces wear and the ends of said strips are worn progressively exposing adjacent portions of the overlapped strips and bonding material for frictional engagement with another brake part.

3. A high temperature disc according to claim 2 wherein said pyrolized bonding material consists of a pyrolized resin.

4. A high temperature disc according to claim 2 wherein said high temperature pyrolized material consists of carbon cloth.

* * * * *